United States Patent [19]

Hartung

[11] 4,049,319
[45] Sept. 20, 1977

[54] WHEEL CONSTRUCTION

[75] Inventor: Richard S. Hartung, Bedford, Pa.

[73] Assignee: Hedstrom Co., Bedford, Pa.

[21] Appl. No.: 668,189

[22] Filed: Mar. 18, 1976

[51] Int. Cl.² .................................. B60B 37/00
[52] U.S. Cl. ............................. 301/1; 301/2.5; 301/111; 29/432
[58] Field of Search ............ 301/1, 2.5, 7, 105 R, 301/105 B, 111, 112, 121, 122, 120, 126, 5 R; 280/62, 63, 78, 282; 46/220; 29/432; 16/45, 97, 107

[56] References Cited

U.S. PATENT DOCUMENTS

| 509,801 | 11/1893 | Gendron | 301/2.5 |
| 1,157,666 | 10/1915 | Bennett | 29/432 |
| 1,354,114 | 9/1920 | Lindberg | 301/120 |
| 2,455,216 | 11/1948 | Blanton | 301/1 |
| 2,940,781 | 6/1960 | Erikson | 301/111 |
| 3,098,027 | 7/1963 | Flower | 29/432 |

FOREIGN PATENT DOCUMENTS

| 70,439 | 9/1928 | Germany | 301/111 |
| 289,697 | 10/1931 | Italy | 301/111 |

Primary Examiner—Robert B. Reeves
Assistant Examiner—H. Grant Skaggs
Attorney, Agent, or Firm—Cesari and McKenna

[57] ABSTRACT

A wheel of the welded spoke variety has a hub with specially designed end caps. If the wheel is to be used as a front wheel of a tricycle, a pedal crank shaft having radial tabs is slid through openings in the end caps having inwardly projecting lips. As the shaft is forced further through the hub, the tabs slice into the rim around the opening in the distal end cap and also upset portions of the rim ahead of the cut into shaft slots just ahead of the tabs. This locks the hub to the shaft both axially and rotationally. If the wheel is to be used on a sidewalk bike with a coaster brake installed in the hub instead of a pedal crank, a circular array of teeth are formed in the outer surface of the proximate end cap which interfit with teeth on an element of the brake so that the brake element and hub rotate together.

6 Claims, 8 Drawing Figures

WHEEL CONSTRUCTION

BACKGROUND OF THE INVENTION

This invention relates to an improved wheel construction. It relates more particularly to improvements in wheels of the welded spoke variety which permit those wheels to accommodate pedal cranks and coaster brakes so that the wheels can be used as the front wheels of tricycles and as the rear wheels of sidewalk bikes.

Welded spoke wheels have been available for several years. The basic construction is described in U.S. Pat. No. 3,431,025. In the manufacture of this type of wheel, the inner ends of the spokes are positioned at the opposite ends of a cylindrical tube comprising the wheel hub. Then circular end caps are positioned against the spokes in register with the tube ends and are welded to the tube ends with the spokes also being caught in the weld. Openings for an axle are punched in the end caps prior to their securement to the tube to accommodate the wheel axle.

Until now, welded spoke wheels have had limited application. Invariably they are used as the rear wheels of tricycles or in other applications where the wheels are not associated with pedal cranks or coaster brakes. The reason for this is that, until now, it has not been feasible to fit such wheels with those elements without drastically changing the basic and proven hub construction of such wheels. Accordingly, until now the cost savings that results from the use of welded spoke wheels in those applications have not materialized.

SUMMARY OF THE INVENTION

Accordingly, the present invention aims to provide improvements in wheels of the welded spoke variety that permits such wheels to be used with pedal cranks and coaster brakes.

Another object of the invention is to provide an improved technique for rotationally and axially locking a welded spoke wheel hub to a shaft or coaster brake.

Still another object of the invention is to provide a technique for combining a pedal crank or coaster brake with a welded spoke wheel at minimum cost and without changing the basic construction of the wheel hub.

Other objects will in part be obvious and will in part appear hereinafter.

The invention accordingly comprises the features of construction, combination of elements and arrangement of parts which will be exemplified in the following detailed description, and the scope of the invention will be indicated in the claims.

Briefly, the subject welded spoke wheels are made in the conventional way described in the aforesaid patent except that at least one end cap on the wheel hub is slightly modified. That is, the wheel hub includes the usual cylindrical tube and when the wheel is assembled, the inner ends of the spokes are positioned around the opposite ends of that tube. Then end caps are welded to the tube ends trapping the spokes in the weld seams. Also, openings are punched in the end caps to accommodate the wheel axle.

In the process of punching these openings, a pronounced lip is formed around each opening which extends toward the center of the hub. If a wheel is to be used as the front wheel of a tricycle, advantage is taken of that lip to help lock the wheel hub to a pedal crank shaft so that the two rotate together. The only modification to the standard wheel is the provision of slots or keyholes contiguous with the opening in one of the end caps.

Thus modified, the wheel hub is ready to accommodate a specially configured pedal crank shaft. The shaft, being straight at the outset, is formed with pairs of radially extending tabs spaced apart along its length a distance approximately equal to the length of the wheel hub. The tabs in one set are tapered for reasons that will become apparent later.

To connect the wheel hub to the shaft, the end of the shaft closest to the tapered tabs is slid into the opening in the slotted end cap. The slots are arranged and adapted to permit passage of the tapered tabs as the shaft is slid through the hub and through the opening in the distal end cap. The set of tapered tabs thereupon engages the inwardly projecting lip around the opening at the distal end cap. At this point, the shaft is forced still further through the hub so that those tabs actually slice or cut into the lip thereby rotationally locking the shaft to the end cap. Also in being forced through the lip, the tabs upset portions of the lip into slots in the shaft just ahead of the tabs. This locks the shaft axially to the end cap. Further, when the tabs are thus anchored in the distal end cap, the other set of tabs is in register with the slots in the proximate end cap to provide additional rotational securement between the shaft and hub.

Following installation of the shaft as aforesaid, the portions of the shaft beyond the ends of the hub are bent at right angles to form the finished pedal cranks.

If the wheel is to be used in conjunction with a coaster brake, the proximate end cap, instead of being slotted, is formed with a circular array of teeth on its opposite end face. These teeth interfit with corresponding teeth on an element of a coaster brake housed in the hub thereby preventing relative rotation between the brake element and hub.

Thus the present construction permits wider application of welded spoke wheels in that they can now be used in conjunction with pedal cranks as the front wheels of tricycles and in conjunction with coaster brakes as the rear wheels of sidewalk bikes. Yet the adaption of such wheels for these purposes does not require any change in the basic wheel design so that existing wheel manufacturing machines and assembly techniques can still be used. Thus the wheels cost less to make than prior non-welded spoke wheels equipped with pedal cranks and coaster brakes.

BRIEF DESCRIPTION OF THE DRAWINGS

For a fuller understanding of the nature and objects of the invention reference should be had to the following detailed description taken in connection with the accompanying drawings in which.

DESCRIPTION OF THE PREFERRED EMBODIMENTS

Figure 1:
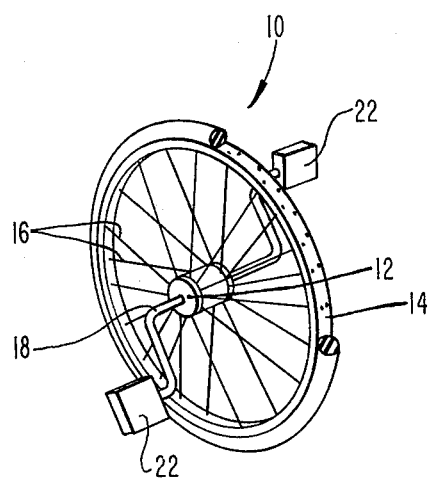
FIG. 1 is a perspective view of a welded spoke wheel equipped pedal cranks to function as a front wheel of a tricycle.

Turning now to FIG. 1 of the drawings, a pedal-equipped tricycle wheel indicated generally at 10 has a hub 12 and an outer rim 14 connected to the hub by a circular array of spokes 16. A pedal crank shaft 18 extends through the hub and is terminated by pedals 22 rotatively connected to the ends of the shaft.

Figure 2:
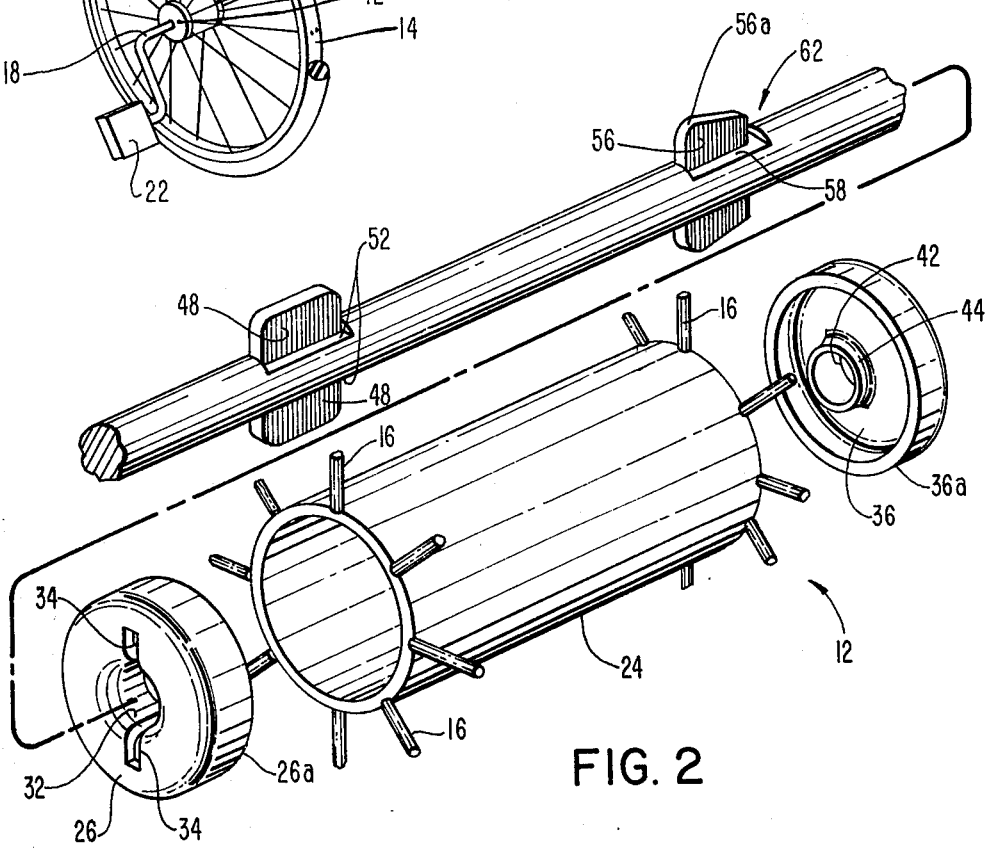
FIG. 2 is an exploded perspective view on a larger scale showing the hub of the FIG. 1 wheel in greater detail.

Referring now to FIG. 2, hub 12 comprises the usual cylindrical tube 24. The inner ends of the spokes 16 are positioned against the ends of tube 24 and distributed around the tube in the usual way. A circular end cap 26, having a circumferential skirt 26a is positioned against spokes 16 in register with one end of tube 24. In accordance with technique disclosed in the above patent, the cap is welded to the tube forming a weld seam 28 shown in FIG. 3, with the ends of the spokes 16 being caught in the weld seam and firmly anchored to the hub. End cap 26 has an axial opening 32 punched through it and in all respects the end cap is a standard one except for a pair of diametrically opposite radial slots 34 formed therein contiguous with opening 32.

Another end cap 36 having a circumferential skirt 36a is welded to the opposite end of tube 24 along a weld seam 38 thereby anchoring the ends of the spokes 16 at that end of the tube in the process. This cap also has an axial opening 42 punched through it and, as best seen in FIG. 2, the formation of the opening produces a pronounced lip or skirt 44 extending all around the opening and projecting toward the center of the hub.

Figure 3:
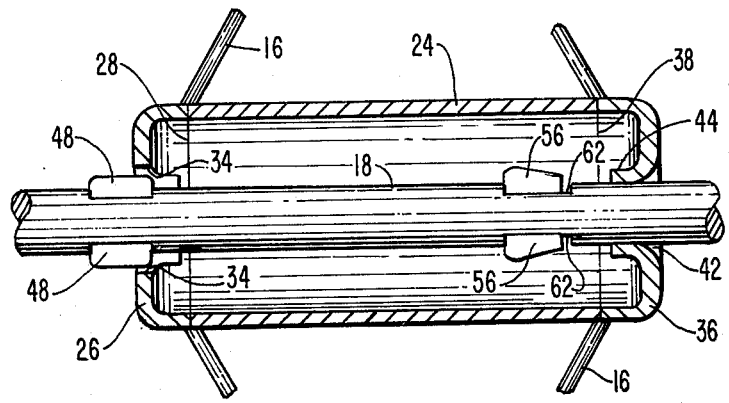
FIG. 3 is a fragmentary sectional view with parts in elevation showing the hub portion of the FIG. 1 wheel partially assembled.

Turning now to FIGS. 2 and 3, before it is installed on the wheel 10, the pedal crank shaft 18 is devoid of pedals 22 and is straight. The shaft is formed with a pair of diametrically opposite, radially extending, rectangular tabs or teeth 48. The striking of these tabs also creates a pair of flats 52 at the base of each tab 48 at each side thereof.

A second pair of diametrically opposite, radially extending tabs or teeth 56 are struck in the shaft. The second pair of tabs is spaced from the first pair a distance approximately equal to the length of the wheel hub 12. Tabs 56 are somewhat different from tabs 48 in that each one is tapered in two directions. More particularly, each tab 56 is shorter at its end closest to the adjacent end of shaft 18. Also as best seen in FIG. 4B, the thickness of each tab 56 varies along its length, the tab being thicker at its end closest to the end of shaft 18.

The shaft 18 is installed in hub 12 by inserting its end closest to tabs 58 (i.e. the right hand end in FIG. 2) through the opening 32 in the end cap 26 containing the slots 34. These slots are arranged and adapted to permit passage of tabs 56 as the shaft is slid through the hub and out through opening 42 in the opposite end cap 36 as best seen in FIG. 3.

Figure 4A:
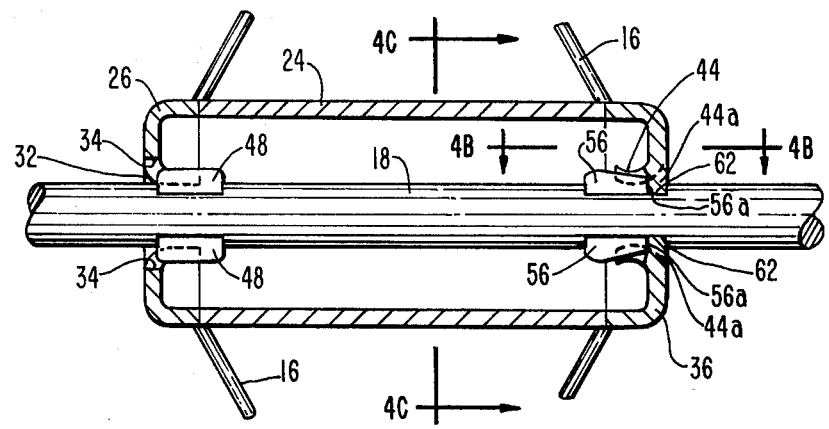
FIG. 4A is a similar view illustrating the fully assembled hub portion.
Figure 4B:
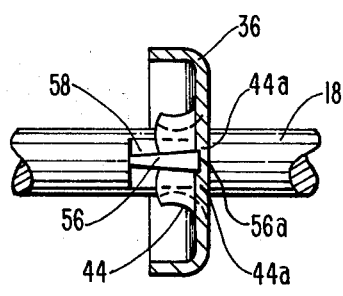
FIG. 4B is a view along lines 4B—4B of FIG. 4.
Figure 4C:
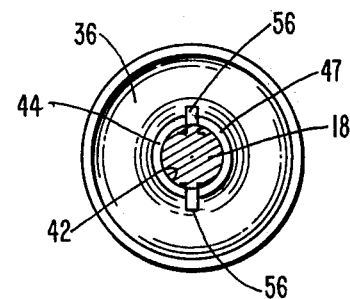
FIG. 4C is a view taken along lines 4C—4C of FIG. 4.

Referring now to FIGS. 4A to 4C, as the shaft 18 is forced still further through the hub, the leading edges 56a of tapered tabs 56 cut or slice into the lip 44 around opening 42 so that the tabs become rotatively keyed to that skirt and thus to the end cap 36 as a whole. In addition, the leading edges of tabs 56 upset or force skirt portions 44a ahead of the cuts down into slots 62 formed in shaft 18 just ahead of tab edges 56a as best seen in FIG. 4A. With the skirt portions 44a being pressed into slots 62, the end cap 36, and thus the hub as a whole, is locked axially and rotationally to shaft 18 due to these interfitting means.

Also as seen in FIG. 4A, when the end cap 36 is thus anchored to shaft 18, the other set of teeth 48 are in register with the slots 34 in end cap 26. Thus cap 26 is also keyed for rotation with shaft 18 so that both ends of the hub are accordingly the hub itself and the entire wheel are forced to rotate with the shaft.

Following the installation of the shaft in the hub, the shaft ends are bent at right angles as shown in FIG. 1 and the pedals 22 are installed in the usual way to complete the wheel.

Thus the assembly of the pedal crank and wheel requires no welds, bolts, rivets, or other means that are typically used to secure such elements together. Rather only a simple pressing operation is required to force the shaft 18 into the hub to the degree required to upset the skirt portions 44a in end cap 36. Yet the resultant connection between the shaft and hub are quite secure both axially and rotationally.

Figure 5:
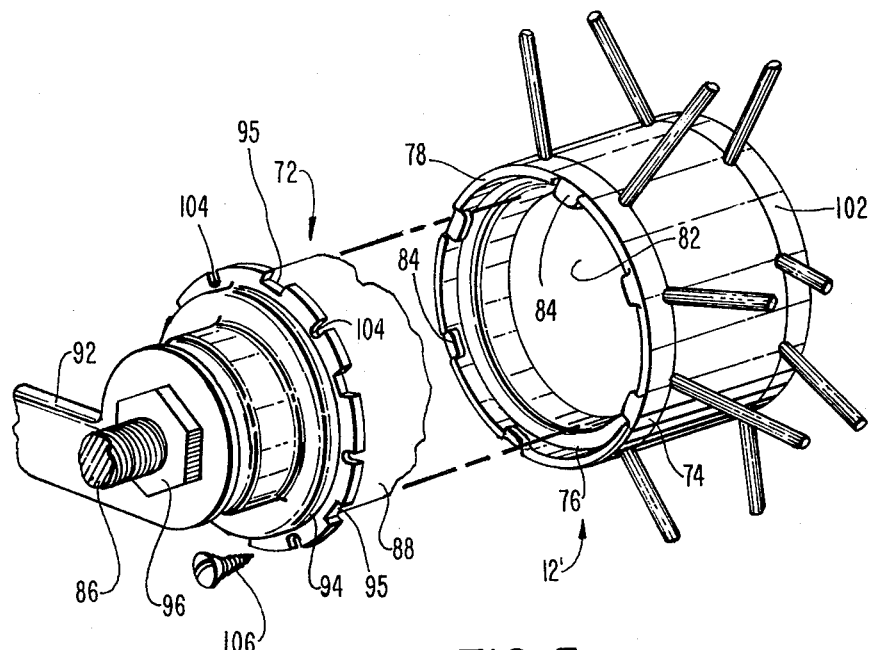
FIG. 5 is a view similar to FIG. 2 showing a rear wheel with coaster brake incorporating my teachings.
Figure 6:
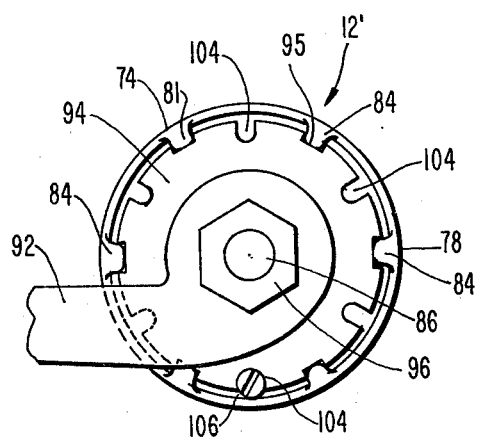
FIG. 6 is an end view of the hub portion of the FIG. 5 wheel.

Referring now to FIGS. 5 and 6, if the wheel is to be used in connection with a coaster brake 72, its hub 12' has a toothed end cap 74 instead of the slotted end cap 26. The end face of cap 74 is recessed as at 76 leaving a circumferential lip 78 projecting out from the end of the end cap. Also a relatively large axial opening 82 is formed in the end cap to accommodate the coaster brake.

A circular array of radially inwardly extending teeth 84 are struck from the lip 78 so as to project into recess 76. In the illustrated embodiment there are six such teeth evenly distributed around the end cap 74.

The brake 72 may be considered conventional for purposes of this disclosure. It includes a shaft 86 on which is mounted the usual variable slip brake elements 88. An arm 92 rotatively keyed to shaft 86 is arranged to be secured to the bike frame. Between those two elements is a toothed brake component 94 having slots 95 rotatively mounted on the shaft. A nut 96 is turned down onto shaft 86 to retain the brake elements on the shaft.

When brake 72 is seated in hub 12', brake component 94 seats in end cap recess 76 and interfit its slots 95 with teeth 84 so that it is constrained to rotate with the hub 12'. Shaft 86 extends out through end cap 102 at the opposite end of hub 12'.

Slots 104 are provided in brake component 94 to accommodate one or more sheet metal screws 106 turned down into screw holes (not shown) provided in end cap 74. These screws retain brake 72 in the hub and the brake component 94 in interfitting engagement with teeth 84 in the end cap.

The completed wheel is mounted on a standard bicycle frame in the usual way by means of the threaded shaft ends projecting from the opposite ends of the hub 12'.

Here again then, without material modification of the basic welded spoke wheel design, the wheel hub is able to accommodate a coaster brake so that the wheel can be used on standard sidewalk bikes usually equipped with such brakes.

We have seen from the foregoing then that pedal cranks and coaster brakes can be installed on welded spoke wheels in such a way that the basic wheel design is not changed and without requiring any special welds, bolts, or assembly techniques that might increase the difficulty or cost of assembling the wheels.

It will be seen also that the objects set forth above among those made apparent from the preceding description are efficiently attained and since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

I claim:

1. A wheel assembly comprising
   A. a shaft,
   B. at least one tab projecting radially out from the shaft and extending along the shaft so as to present an edge facing one end of the shaft,
   C. a wheel including a wheel hub composed of a tube whose bore cross-section is appreciably larger than that of the shaft and first and second end caps secured to the opposite ends of the tube,
   D. means defining axial aligned openings in the end caps to accommodate the shaft,
   E. a lip extending around the opening in at least the second end cap, said lip projecting into the hub, and
   F. at least one slot contiguous with the opening in the first end cap, said slot being arranged and adapted to permit passage of the tab when said one end of the shaft is inserted through the openings in the first and then the second end caps, said shaft being positioned axially in the hub so that said tab edge has sliced into the lip around the opening in the second end cap thereby rotatively locking the hub to the shaft.

2. The wheel assembly defined in claim 1 wherein there are two tabs positioned on diametrically opposite sides of the shaft and also two slots positioned on diametrically opposite sides of the opening in the first end cap.

3. The wheel assembly defined in claim 1 and further including an additional tab projecting radially out from the shaft and extending along its length, said additional tab being spaced from the first mentioned tab a distance approximately equal to the length of said hub so that the additional tab is in register with the slot in the first end cap.

4. The wheel assembly defined in claim 1 wherein each said tab is tapered in the width direction so that it is thicker at its end facing the second end cap.

5. The wheel assembly defined in claim 4 wherein each said tab is also tapered in the height direction with the shorter end of the tab facing the second end cap.

6. The wheel assembly defined in claim 1 and further including a slot in the shaft adjacent each said tab edge arranged so that when each said tab is sliced into said lip, the portion of the lip ahead of each tab is upset down into said shaft slot to axially anchor the shaft to the hub.

* * * * *